June 24, 1958 K. G. HUNTLEY 2,840,704

PREVENTION OF CIRCULATION OF PLURAL PULSES IN GENERATOR RING

Filed March 30, 1954

INVENTOR
K. G. Huntley
By [signature]
ATTORNEYS

1

2,840,704

PREVENTION OF CIRCULATION OF PLURAL PULSES IN GENERATOR RING

Keith Gordon Huntley, Harlington, Hayes, England, assignor to Electric & Musical Industries Limited, Hayes, England, a company of Great Britain Application March 30, 1954, Serial No. 419,880

Claims priority, application Great Britain April 7, 1953

7 Claims. (Cl. 250—27)

This invention relates to pulse generator chain circuits, such as employed, for example, as pulse distributors in multi-way electronic switching circuits.

In multi-way electronic switching circuits, and for other purposes, a circuit for generating pulses and distributing successive pulses each on separate conductors is required. This can be achieved in practice by means of a so-called ring counter consisting of a plurality of switchable devices coupled to form a ring and so arranged that one device at a time is in a different condition from all the others, and on the application of switching pulses, the effect is to cause circulation of the distinctive "condition" round the ring at a rate determined by the switching pulses, to produce a pulse on said devices in succession. To avoid ambiguity in the operation of the switching circuits it is necessary that the circuit should operate in a single mode, that is, only one distinctive condition should circulate repeatedly round the ring at one time, but difficulty is encountered in ensuring operation in only a single mode since even if only a single pulse be injected in the ring to initiate operation, supply-switching transients may generate others in the ring. It is possible to avoid the difficulty by employing an open chain circuit instead of a ring chain circuit and to inject a suitable pulse at the beginning of the chain after the preceding pulse has been transferred to the end of the chain, but this solution requires additional equipment since frequency division will, in general, be involved in the production of the injected pulses.

The object of the present invention is to reduce the difficulty referred to in the preceding paragraph.

According to the present invention there is provided a pulse generator chain circuit comprising a plurality of switchable devices coupled to form a closed ring and coupled to means for applying switching pulses to said devices, so that on the application of switching pulses a predetermined condition can be transferred successively from one device to the next to cause said condition to circulate round the ring, and wherein means are provided so arranged that following a transfer of said condition past one point in said ring a further transfer is prevented for such a time that the circuit can only continue to operate in a single mode at one time.

In order that the invention may be clearly understood and readily carried into effect, the invention will be described with reference to the accompanying drawings.

Figure 1:
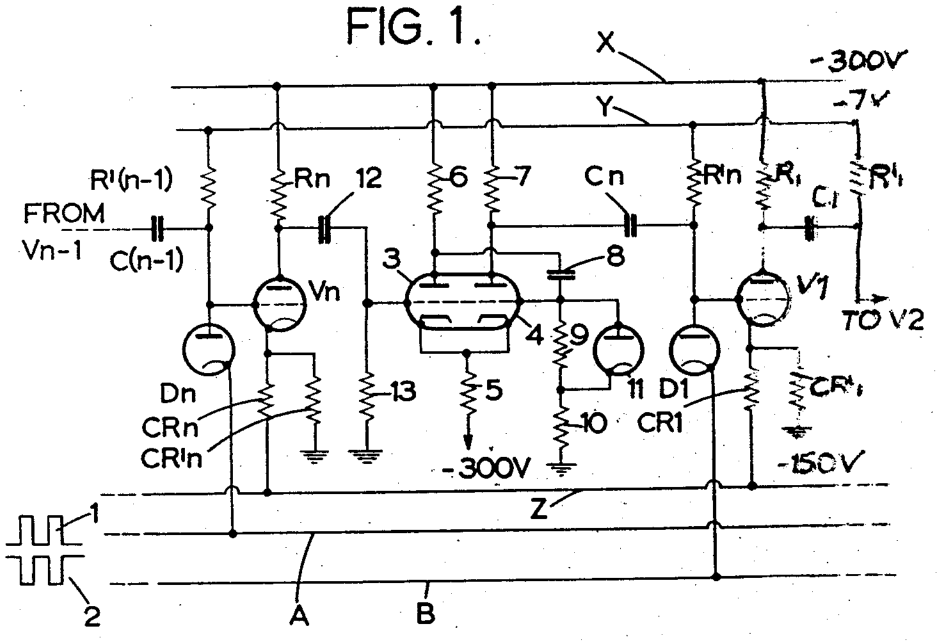
Figure 1 illustrates one example of the present invention applied to a ring counter of the construction described with reference to Figure 1 of U. S. patent specification No. 2,802,105.

Referring to Figure 1 the counter comprises a series of thermionic vacuum valves V1 . . . V*n* (*n* being an even number) each a triode and each with similar circuit connections and coupled to its neighbours so as to form a ring chain. Since the valve stages are identical only two of the stages containing the valves V1 and V*n* are shown and the corresponding components in the different stages are distinguished by the suffixes 1 and *n*. The valves V1 and V*n* have their anodes connected to the positive H. T. bus-bar X by resistors R1 and R*n* and their anodes are also coupled to the control electrodes of the succeeding valves by capacitors C1 and C*n*, the coupling via C*n* being, however, indirect as will hereinafter appear. The capacitors C1 and C*n* have leak resistors R'1 and R'*n* which are returned to a bus-bar Y maintained on a small fixed positive potential, say 7 volts as indicated. The control electrodes of the valves are, moreover, coupled alternately to switch pulse bus-bars A and B via diode valves D1 and D*n* which have their anodes nearer the control electrodes. The valve V1 has its cathode connected to the junction of cathode resistors CR1 and CR'1 which are connected in series between ground and the negative H. T. bus-bar and the cathode of the valve V*n* is similarly connected to the junction of cathode resistors CR*n* and CR'*n*. The bus-bars A and B are fed with complementary switching pulse waveforms 1 and 2 from any suitable source which may be of the construction described in the aforesaid U. S. patent specification No. 2,802,105.

As so far described, the circuit is the same as described in the first aforesaid U. S. patent specification No. 2,802,105, but in accordance with the present invention, a relaxation device is introduced into the chain between the anode of the valve V*n* and the coupling capacity C*n*. The relaxation device is in the form of a cathode-coupled multivibrator and it consists of two valves 3 and 4 coupled at their cathodes by a common cathode resistance 5, which, as shown, is taken to a negative H. T. potential of —300 volts. The valves have anode load resistors 6 and 7 and the anode of the valve 3 is coupled to the control electrode of the valve 4 by a condenser 8 which has leak resistors 9 and 10, the former of which is shunted by a diode 11. The multivibrator is introduced into the ring chain by connecting the anode of the valve V*n* to the control electrode of the valve 3 via capacitor 12 which has a leak resistor 13 and by connecting the capacitor C*n* to the anode of the valve 4 as shown.

As far as the valves V1 to V*n* are concerned the operation of the circuit is the same as described in the aforesaid U. S. patent specification No. 2,802,105. Thus, all the valves V1 to V*n* tend to remain in the non-conducting condition (which may be termed the stable condition) but if the valve V1, say, is switched to a conducting condition (which may be termed the unstable condition), this condition is transferred to successive valves in the chain on the application of the switching pulse waveforms 1 and 2 to the bus-bars A and B. A positive pulse can therefore be derived from the cathodes of the valves V1 to V*n* in succession, or (if desired) a negative pulse can be derived from the anodes of the valves in succession. When, in turn, the valve V*n* is switched to the conducting condition, it will be assumed that the multivibrator has the valve 3 conducting and the valve 4 non-conducting and that the charge in the capacitor 8 is such that the fall in potential transmitted from the anode of the valve V*n* to the control electrode of the valve 3, when the valve V*n* is switched on, switches the multivibrator to the alternate condition with the valve 3 non-conducting and the valve 4 conducting. When the next negative pulse to occur to the bus-bar A restores the valve V*n* to the non-conducting condition the positive potential excursion of the anode of the valve V*n*, restores the multivibrator to its initial condition by switching on the valve 3 and switching off the valve 4. This produces a rise in potential at the anode of the valve 4 which is transmitted via capacitor C$n$ to the control electrode of the valve V1, switching on this valve so that a further circulation round the ring commences. When the valve 4 is switched off, the capacitor 8 commences to discharge through the resistors 9 and 10 and an interval determined by the time constant of 8, 9 and 10 elapses before the potential at the control electrode of the valve 4 rises to such a level that the valve 3 can again be switched off in response to the negative pulse produced at its control electrode by switching on the valve V$n$. Therefore for an interval determined by the time constant of 8, 9 and 10 the multivibrator cannot transmit the conducting condition from the valve V$n$ to the valve V1, and by a suitable choice of the time constants it is arranged that the insensitive interval of the multivibrator is between $n/2$ and $n$ switching pulse times. As a result while the multivibrator permits the circulation of a single conducting condition round the ring, it suppresses any additional "conducting conditions" which may tend to circulate and to insure that the circuit can only continue to operate in a single mode at one time. It will be appreciated that any two successive pulses circulating round the ring will have one of the intervals between them equal to or less than $n/2$ switching pulse times so that one of these pulses will always be stopped by the multivibrator. Therefore there can be a wide tolerance in the insensitive interval of the multivibrator.

On first switching on the counter, the multivibrator, since it is capable of free running, will always produce a positive pulse at the anode of the valve 4 and switch on the valve V1, thereby initiating a pulse circulation in the counter, if no other pulse is spontaneously produced. When the multivibrator is running free, it alternates between the state having the valve 3 conducting and the state having the valve 4 conducting at a rate determined by the time constant of 8, 9 and 10 on the one hand and the time constant of 8, 11 and 10 on the other hand. For example, assume that the valve 3 has just been switched on, the potential at the anode of the valve 3 is then near the potential at the cathode of that valve and also at the cathode of the valve 4, say about earth potential. The capacitor 8 is charged and therefore the control electrode of the valve 4 is well below earth potential and the diode 11 is maintained non-conducting. The capacitor can then discharge only through the resistors 9 and 10, so that the discharge is relatively slow. Eventually however the potential at the control electrode of the valve 4 rises to earth potential and current begins to flow in the valve 4. Regeneration by way of the coupling resistor 5 and the coupling capacitor 8 then rapidly switches on fully the valve 4 and switches off the valve 3. The anode of the valve 3 thereupon rises to the potential of the bus bar X, and the control electrode of the valve 4 is carried to a highly positive potential. As a result the diode 11 is switched on and the capacitor 8 can now charge relatively rapidly through the device 11 and the resistor 10 until the potential at the control electrode of the valve 4 falls to about earth potential, tending to turn off the valve 4, thereby initiating another transition of the multivibrator. In both conditions of the multivibrator the return path for the current of the capacitor 8 is by way of the resistor 6 and the H. T. source.

Figure 2:
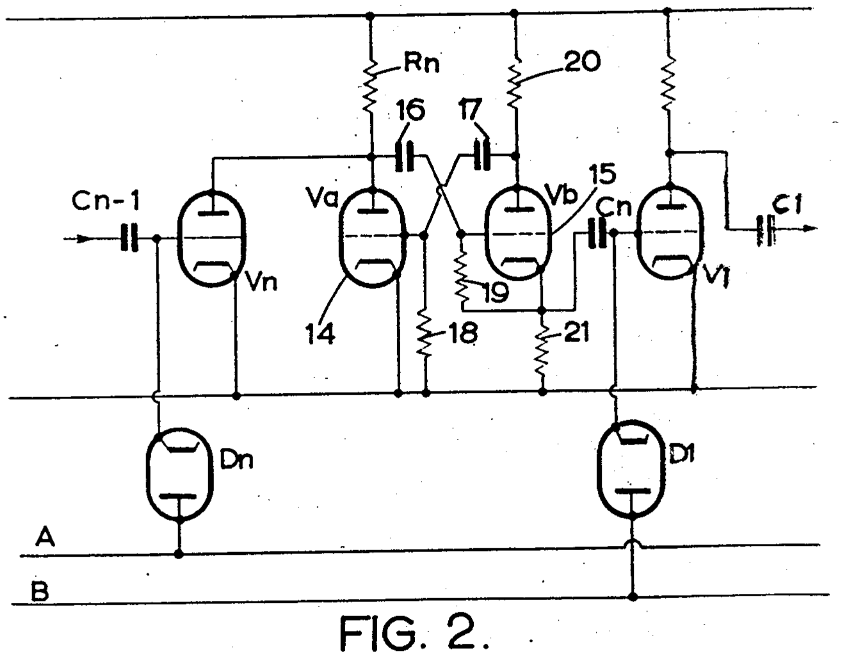
Figure 2 illustrates another example of the present invention applied to a ring counter of the construction described with reference to Figure 4 of said U. S. patent specification No. 2,802,105.

The example of the invention illustrated in Figure 2 is generally similar to that illustrated in Figure 1 and corresponding parts in the two figures are denoted by the same numerals. The valves V1 to V$n$ are, however, arranged in the case of Figure 2 for the propagation of the non-conducting condition, all the valves V1 to V$n$ being normally conducting except one so that the conducting condition is the stable condition in this case. Thus, in Figure 2, the diodes D1 to D$n$ have their polarities reversed, and the leak resistors R'1 to R'$n$ for the capacitors C1 to C$n$ are unnecessary since their function is served by the flow of current to the control electrodes of the valves V1 to V$n$. Moreover, the cathode resistors for the valves V1 to V$n$ are dispensed with. The operation of the circuit, as far as regards the valves V1 to V$n$ is described in the aforesaid U. S. patent specification No. 2,802,105.

In Figure 2 the relaxation device which is introduced in the ring chain is again in the form of a multivibrator consisting of two valves 14 and 15 having their anodes and control electrodes cross-coupled by capacitors 16 and 17 and resistors 18 and 19. The valve 14 has its anode connected directly to the anode of valve V$n$ so that the anode load resistor R$n$ serves for both valves. The valve 15 has an anode load resistor 20 and a cathode resistor 21, the capacitor C$n$ being connected at one side to the cathode of the valve 15.

The time constant of the capacitor 17 and resistor 18 is arranged to be many times the period of circulation round the ring so that when the non-conducting condition reaches the valve V$n$, the valve 14 will normally be non-conducting. When the valve V$n$ is switched off the positive potential excursion of the anodes of the valves V$n$ and 14 has no effect on the valve 15 since this valve is already conducting. However, when the valve V$n$ is again switched on in response to the next positive pulse on the bus-bar A, the negative potential excursion at the anodes of the valves V$n$ and 14 switches off the valve 15 and applies a negative potential excursion via capacitor C$n$ to the valve V1 switching off the latter valve and ensuring further circulation round the ring. The simultaneous circulation of more than one condition in the ring is suppressed, as in the case of Figure 1, by arranging the time constant of capacitor 16 and resistor 19 to be such that the multivibrator remains insensitive to circulating pulses until an interval of between $n/2$ and $n$ switching pulse times has elapsed.

As in the case of Figure 1, on switching on the circuit shown in Figure 2, the multivibrator since it is free running will produce a starting pulse at some time if no other pulse has occurred on first switching on.

The present invention is not confined to ring chain circuits of the kind illustrated. For example, it can be applied to ring counters of the form described with reference to Figure 1 in co-pending U. S. patent specification application Serial No. 418,195 and the relaxation device may have other forms, for example a blocking oscillator may be used.

What I claim is:

1. A pulse generator chain circuit comprising a plurality of switchable devices each having a stable condition and an unstable condition, a coupling from each device to a succeeding device to form a closed ring, each coupling being responsive to a transition of the first of two coupled devices from the unstable condition to the stable condition to produce the inverse transition of the second of two coupled devices, and means for applying switching pulses to the devices individually, said pulses being predetermined to switch a device from the unstable condition to the stable condition whereby the unstable condition can be circulated repeatedly round the ring with a circulation time determined by said switching pulses, one of said couplings including means to render the respective coupling responsive to transitions of the corresponding preceding device only after an interval which is between one half and the whole of said circulation time from a preceding response to cause the circuit to operate in a single mode at one time.

2. A circuit according to claim 1, each switchable device comprising a single valve having at least an output electrode, a control electrode and a cathode, an output electrode-to-cathode circuit for said valve and a control electrode-to-cathode circuit for said valve, each coupling comprising a single path including a capacitor connected from the output electrode-to-cathode circuit of the first of two coupled devices to the control electrode-to-cathode circuit of the second of two coupled devices.

3. A circuit according to claim 1, said means included in the last-mentioned coupling comprising a periodic device.

4. A circuit according to claim 1, said means included in the last-mentioned coupling comprising a multivibrator, a connection from the corresponding preceding device to the multivibrator for switching the multivibrator from a first condition to a second condition in response to a transition of said preceding device from the unstable condition to the stable condition, a time constant circuit connected to the multivibrator to delay the return of the multivibrator to said first condition for an interval which is between one half and the whole of said circulation time, and a connection from the multivibrator to the succeeding device responsive only to a transition of the multivibrator from said first condition to said second condition to switch said succeeding device to the unstable condition.

5. A pulse generator chain circuit comprising a plurality of switchable devices each having two conditions of conductivity of which one at least is a stable condition, a coupling from each device to a succeeding device to form a closed ring, each coupling being responsive to a transition of the first of two coupled devices to one condition from the other condition to produce an inverse transition of the second of two coupled devices, and means for applying switching pulses to the devices individually, said pulses being predetermined to switch a device to one condition whereby the unstable condition can be circulated repeatedly round the ring with a circulation time determined by said switching pulses from its other condition, one of said couplings including a periodic device whose natural period is predetermined to render said periodic device responsive to transitions of the corresponding preceding device only after an interval which is between one half and the whole of said circulation time from the preceding response to cause the circuit to operate in a single mode at one time.

6. A circuit according to claim 5 said periodic device comprising a relaxation device.

7. A circuit according to claim 5 said periodic device comprising a multivibrator, a connection from the corresponding preceding device to the multivibrator for switching the multivibrator from a first condition to a second condition in response to a transition of said preceding device from the unstable condition to the stable condition, a time constant circuit connected to the multivibrator to delay the return of the multivibrator to said first condition for an interval which is between one half and the whole of said circulation time, and a connection from the multivibrator to the succeeding device responsive only to a transition of the multivibrator from said first condition to said second condition to switch said succeeding device to the unstable condition.

References Cited in the file of this patent

UNITED STATES PATENTS

| | | |
|---|---|---|
| 2,099,065 | Holden | Nov. 16, 1937 |
| 2,536,035 | Cleeton | Jan. 2, 1951 |
| 2,542,644 | Edson | Feb. 20, 1951 |

FOREIGN PATENTS

| | | |
|---|---|---|
| 614,220 | Great Britain | Dec. 10, 1948 |